B. LOOMIS.
PROCESS OF RETTING, UNGUMMING, AND DRYING FIBER PLANTS AND WOODY MATERIAL.
APPLICATION FILED AUG. 2, 1915.
1,271,591.  Patented July 9, 1918.
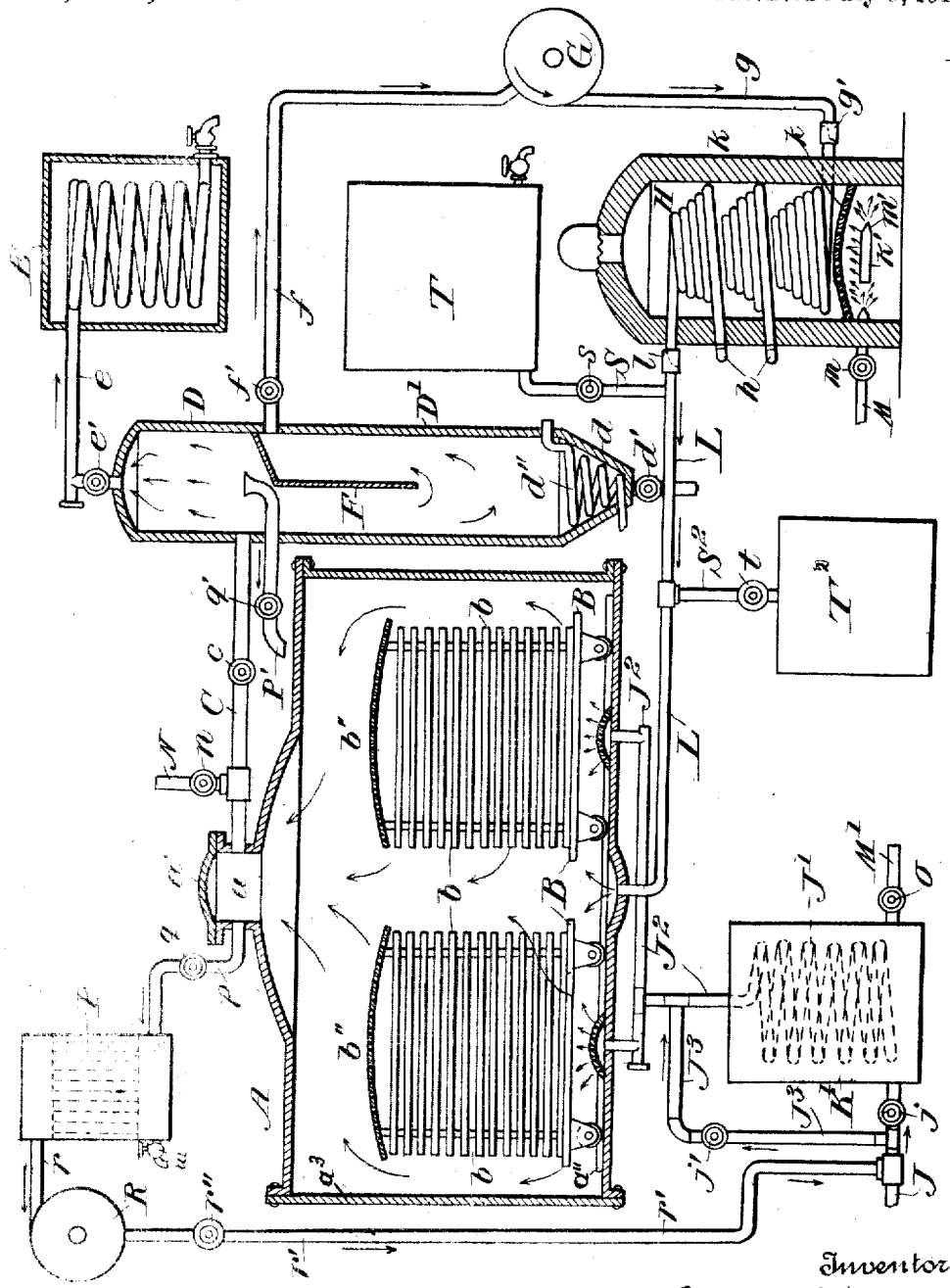
Inventor
Burdett Loomis
By E. B. Clark
Attorney

UNITED STATES PATENT OFFICE.

BURDETT LOOMIS, OF HARTFORD, CONNECTICUT.

PROCESS OF RETTING, UNGUMMING, AND DRYING FIBER PLANTS AND WOODY MATERIAL.

1,271,591. Specification of Letters Patent. Patented July 9, 1918.

Original application filed July 23, 1912, Serial No. 711,048. Divided and this application filed August 2, 1915. Serial No. 43,210.

*To all whom it may concern:*

Be it known that I, BURDETT LOOMIS, a citizen of the United States, residing at Hartford, in the county of Hartford and State of Connecticut, have invented certain new and useful Improvements in Processes of Retting, Ungumming, and Drying Fiber Plants and Woody Material, of which the following is a specification.

This invention relates to a process of retting or extracting resinous and gummy material from flax, hemp and other fiber plants including woody material and lumber for separating the fiber from the bark and woody material, and to drying the product.

The object of my invention is to provide for quickly retting or extracting resinous and gummy material from fiber plants, such as flax, hemp, esparto grass, banana, cane, and woody material, including lumber, in a closed tank, by dissolving and extracting the gummy or waxy matter, oil, etc., by means of fatty acids, particularly acetic acid and other solvents derived from the plant or wood, or from other sources, and diffused in warm or hot water and circulated in contact with the fibrous material, at the same time floating off the extracted wax or gum with the circulating warm or hot water and solvent, and causing removal therefrom by skimming or by deposit in a separating chamber, and also repeatedly reheating the water or solvent liquor and circulating it through the material, and then drying the material by means of warm or hot gas.

The retting process, as usually practised, is slow and laborious, and often irregular in action and uncertain in results, producing an indifferent, or an actually damaged, product. By my process I seek to expedite the process, to overcome the difficulties heretofore encountered, and produce a more uniform fiber product, of strong, soft quality and good color; also to dry the product with a neutral, non oxidizing gas directly in the treating tank.

Any tannic acid and coloring matter which may be present in the plant or wood is first extracted by circulating water or a dilute solvent for a short time at a low temperature—between 100° F. and 150° F.—through the body of material and then drawing off the watery extract.

By heating wood and plant material to a moderate temperature ranging between 215° and 245° F., decomposition is set up, resulting in the formation of a number of acids of the fatty acid series, and by raising the temperature there are formed other fatty acids. The formation of fatty acids, among which acetic acid appears in largest quantity, commences, according to Gillot, at 255° F. Other fatty acids are formed, such as formic acid, butyric acid, valeric acid, etc., at the above and higher temperatures.

Simultaneously with the formation of these acids, carbonic acid, carbonic oxid and methane are evolved from the wood or plant material, and these bodies in a nascent state may act upon the acids so that the latter may undergo decomposition by more vigorous heating and a large number of products of decomposition may be formed. Among such products are found methyl alcohol (wood spirits) acetone, methyl, acetic ether, aldehyde and demethyl acetal.

I have discovered that these above mentioned fatty acids, gases and other products of decomposition, when diffused in hot water are an excellent solvent for the gummy, waxy or resinous materials found in wood and plants, and that, if the solvent mixture or solution is circulated in contact with the plant or woody material to be treated the contained gummy, waxy or resinous matter will be quickly liberated and may be drawn off with the circulating solvent liquor. The volatile matter will pass off in the form of vapor and be condensed, and the waxy, gummy or resinous matter will pass off with the water in a semi-liquid condition and will be skimmed off or be deposited and recovered.

I may use any well known commercial acetic acid in solution in water of the desired strength for most economically and effectively dissolving and releasing the tannic acid, gums, resins, etc., from the fibrous material treated.

The matter constituting my invention will be defined in the claims.

I will now describe my process in detail by reference to the accompanying drawing, which represents a sectional elevation of one form of apparatus adapted for carrying out the process.

In the apparatus I provide four principal parts or devices, consisting of an extracting and drying tank A, an expansion and depositing chamber D, D¹, heating coils H located in a furnace below the bottom of tank A, and a condenser E, these parts being suitably connected by valved pipes and a circulating pump being used in the connecting pipes. The extracting tank A may be constructed of boiler iron or other suitable sheet metal, and has at top a mouthpiece a provided with a cover a', an end door a³ and at the bottom a pair of rails a''.

For receiving the fiber plant material or wood I provide wheeled cars or trucks B having racks b containing grids, one above another, and perforated top plates b'' made of sheet metal or strong wire cloth. Space may be provided in each tank for two or more cars and racks as shown.

To the mouthpiece a is connected a water and vapor discharge pipe C, having a valve c, which connects with an expansion and depositing chamber D, D¹, at the top of which connects a vapor discharge pipe e, having a valve e'. The pipe e leads to a condenser E.

The expansion and depositing chamber D, D¹ rises above the tank A. This chamber is made with a tapering lower end d, having a discharge pipe and valve d' for drawing off resinous or gummy material. A steam coil d'' is placed in the lower end of the chamber D¹ for melting resinous or gummy material in case it becomes cold and hardened. At about the middle height of chamber D, D¹, is placed a separating dome or hood F, which may be attached at its edges to the wall of the chamber, as shown, and an outlet pipe f connects with the wall of chamber D¹ at the top of the hood and is provided with a valve f'. The hood is located below the connection of the water and vapor discharge pipe C from treating tank A and provides a vapor expansion chamber or space D above it, and a depositing or catch-all chamber or space D¹ below it. This dome acts as a deflector and separator to cause the waxy or gummy matter to be deposited in the bottom of chamber D¹ while the water or treating liquor flows up into the dome and thence off to the circulating pump G. A positively acting rotary pressure pump is preferably used, though some other kind of positive pressure pump may be employed. A discharge pipe g, connects with the pump and leads to the lower end of a series of heating coils H, supported in a furnace K. Three coils are connected in a series by means of return bends h which extend through the wall of the furnace. Near the bottom of the furnace is provided a perforated arch k for distributing the gas flame, and protecting the lower heating coil. A fire chamber K¹ is provided below the arch k. Gas is preferably burned in the fire chamber and is supplied by a pipe M having a valve m and a burner of any suitable kind m'.

In order to secure satisfactory heating and circulation of liquid through the apparatus, the heater coil H is located so that the top thereof is below the bottom of the extracting and drying tank A.

To the top of the heating coil is connected a return pipe L of the circulating system, and this pipe is also connected to the bottom of the treating or extracting tank A. The return pipe L is provided with a check valve l, and a check valve q' is also placed in the lower end of pipe g at its connection with the coil. These check valves prevent back flow of water or solvent liquor from the tank. To pipe L is connected a blow-off pipe S, having a valve s, and connecting with a storage and settling tank T.

A second storage tank T² to which pipe L is connected by a pipe S² having a valve t, is provided for receiving tannic acid or other extract or solution. A water-supply pipe N, having a valve n, connects with pipe C near the mouth-piece of tank A, or may connect at other desired part of the apparatus, as near the heating coils.

A second heating furnace K¹, containing a coil J¹, is used for heating gas to be used in drying the fiber or wood material after treatment with hot water and solvent solution. A pipe J, having a valve j, leads from a gas holder, and connects with the coil J¹, and a pipe J² leads from top of the coil and connects by two branches with the bottom of tank A. A return pipe p, having a valve q leads from the top of tank A, preferably at the mouthpiece a to the condenser P.

A return pipe r connects the top of the condenser with a rotary exhauster R and a pipe r' having a valve r'' thence leads to the pipe J, connecting with the heating coil J¹, whereby the condensable matter may be removed from the gas, and the noncondensable gas then returned to be reheated. The products of condensation may be drawn off from the condenser by a faucet w. A gas pipe M¹, having a valve o, supplies gas to a burner in furnace K¹ for heating the coil J¹.

The plant material, wood or lumber, is placed in layers on the grids in the racks and held in place by any suitable means, and the trucks are rolled into the tank, the end door a³ being open for the purpose. The door is then closed and secured by bolts or other means.

Now, the system, including tank A, chamber D, D¹, and the coils H, is filled with water or water and acetic acid solvent, admitted by pipe N and caused to rise to the level of the discharge pipe C. Gas is then ignited at the burner m', and the circulating pump G is started. This causes circulation of the liquor through the heating coils and thence up through the extracting tank A in contact with the wood or fiber material.

I may first proceed to extract and remove tannic acid and coloring matter from the material by circulating water and acetic acid at a temperature between 100° F. and 150° F. through the body of material in the tank. Circulation of water at this low temperature is continued till all, or most, of the tannic acid and coloring matter have been extracted, then the acid solution is drawn off into a tank T² by opening valve t in pipe S².

The system is again filled with water and pump G put in operation and the heat increased in the furnace K. As the circulating water becomes heated, approximately to 212° F., some of the fatty acids are produced and pass with the water into the heating coils. As the temperature of the water is gradually raised, other fatty acids, gases and products of decomposition are formed and diffused through the water. The hot circulating water and the solvent fatty acids soon commence to dissolve the cellular structure and release the volatile matter and wax or gum from the fiber or woody material. The vapor, gum and wax pass with the water or liquor into chamber D, D¹, where the volatile vapors separate and fill the vapor space D from which they pass off through pipe e to the condenser E, where condensation is effected. At the same time the circulating water containing resinous or gummy matter which has been released from the plant material is passed down over the separating hood or dome F, where such matter is separated and caused to settle into the depositing chamber D¹, where it collects, while the water passes up through the separating dome F, and thence by pipe f, the circulating pump G, and pipe g into the bottom of the heating coils. By circulating the hot water or solvent liquor up through the fiber material or wood in tank A, the wax and gummy matter are carried upward and floated off with the water through pipe C into chamber D, D¹, where they are deposited.

The circulating hot water or solvent liquor in tank A agitates the body of material and prevents packing, and continuously carries away the extracted wax and gummy matter so as to continuously bring fresh liquor into contact with the material to effectively exert its solvent action on the cellular structure thereof and release the wax or gummy and resinous constituent. In the expansion and depositing chamber D, D³, the volatile matter and the wax or gum readily separates from the liquor, and at the same time the liquor is partially cooled so that the wax or gum is hardened and will readily settle in the bottom of the chamber D¹. The velocity of the flow of liquor is much retarded in this chamber, thereby facilitating the deposit of gum. This action is also aided by the small overflow outlet pipe f from the top of the separating dome F.

The temperature of the water or liquor may be gradually raised in the heating coils to approximately 300° F. As the operation progresses and the heat is increased, the water or liquor becomes charged with an increasing percentage of fatty acids, gases, etc., and these act with increasing energy to dissolve, release and extract the oil, wax, resinous or gummy matter from the material till it is substantially free from such constituents. The operation may be continued for a period varying from six to twelve hours, according to the character of fiber material treated.

The fatty acid solvent solution or acetic acid used in retting or extracting gummy matter from wood and fiber plants may be prepared from any suitable hard wood or other source and diffused in water for obtaining a good solvent for the wax, gum and resinous matter in the plant or wood. The solvent liquor thus previously prepared may be used at a lower temperature, 100° to 200° F. in treating fiber plants or wood to avoid injury to the fiber, where the greatest strength is required.

At suitable intervals, the valve d' may be opened and the resin or gum discharged from the chamber D¹, but this may be mostly discharged at the end of the operation. In case oil is extracted from the plant material it may be drawn off from the top of liquor in chamber D by opening valve q' in pipe P¹.

Any volatile oily vapors distilled by the heat will be passed off at intervals through pipe e to the condenser F.

When the treatment and extraction of wax, gum and oil in tank A is completed, the valve C may be closed and the blow-off valve s opened, permitting the liquor containing the fatty acid and any remaining oil to be blown off into the storage and settling tank T, where it is reserved for treating a succeeding charge of plant or woody material in tank A.

The fiber material or wood may now be dried by warm gas. For this purpose producer gas, or wood gas is admitted by pipe J to the coil J¹, and the gas ignited at the burner. The warm gas is passed from the coils up into the tank and distributed around and between the trays containing layers of material. The moisture will be taken up by the warm gas and passed off with it through pipe p, valve q being open, to the condenser P, where the moisture will be condensed, while the non-condensable gas will be drawn off by the exhauster R, and returned through pipe r' to pipe J leading to the heating coil, where it will be reheated and again circulated through tank A. Circulation is thus continued till the material is sufficiently dried. Air, instead of gas, may be passed through the heating coil J¹ if desired, and if found better adapted for drying certain fiber material; and after condensation of moisture may be forced by the exhauster R repeatedly through the heater and tank A. The temperature of the circulated gas or air may range from 100° F. to 200° F. or higher, if the fiber material or wood is of such a character that it will not be injured by a high temperature. The warm gas or air passes rapidly over the material, and the moist vapors rising from it prevent a rise of temperature and prevent overheating.

Circulation of warm gas will usually be preferable as the gas (composed principally of hydrogen and carbon monoxid) is non-oxidizing, and therefore will not discolor the fiber material.

By closing valve $j$ and opening valve $j'$ in by-pass pipe J³ cool gas may be passed from the holder directly through tank A for cooling the charge of fiber material before opening the door $a^3$ and removing the cars B. By use of the pipe J³ gas may be circulated repeatedly through the tank, the condenser P and exhaust pump R, without passing through the heater, till the material is sufficiently dry and cool to be removed from the tank.

Flax, hard-stalked grasses and other hard fiber material may be subjected in the usual manner to a breaking machine and to a scutching machine or mill after treatment and drying in tank A, for removing bark or chives in case it is desired to separate the more valuable fiber for use in making cordage or textile fabric. The coarse woody material may be separately treated for making cellulose in a beating engine.

In this process it is important that the fiber material be placed approximately straight in layers on the grids or racks in tank A, so that long even retted fiber may be obtained, most suitable for making rope, cordage, shoe lacings, etc. For these and other purposes I produce retted fiber free from snarls and kinks, which fiber could not be made by the process and apparatus covered by my Patent No. 1,122,404, December 29, 1914. The process of this patent is more particularly directed to the treatment of resinous wood to extract the resinous matter and to make cellulose from the remaining cleaned chips. As previously stated in this application the plant material is placed in layers in approximately straight condition and retted for obtaining long, straight fiber. In this process, also, the oily matter which collects on top of the liquor in chamber D. D¹ will be skimmed or drawn off by pipe $p'$. This operation will be particularly advantageous in retting castor oil bean plants.

This is a division of my copending application, Serial Number 711,048, filed July 23, 1912.

Having described my invention, what I claim and desire to secure by Letters Patent, is:

1. The process of retting and ungumming fiber plant material, which consists in placing the material in layers on grids in a closed tank, circulating around and between such layers hot water and fatty acid solvents including acetic acid, till the gummy and resinous matter has been released, floating off the gummy and resinous matter and causing it to be separated from the water, repeatedly reheating the solvent liquor and circulating it through or in contact with the fiber material till retting and ungumming are effected.

2. The process of retting and ungumming fiber plant material, which consists in first extracting tannic acid by circulating in contact with the material warm water at a temperature below 200° F., then drawing off and storing the tannic acid solution, then circulating in contact with the material fatty acid solvent liquor containing acetic acid, at a temperature above 200° F. till the gummy and resinous matter is extracted, floating off such matter with the water and causing it to be separated and deposited, reheating the solvent liquor and circulating it through the fiber material till retting and ungumming are effected.

3. The process of preparing and retting fiber plant and woody material, which consists in extracting oily resinous and gummy matter by circulating in contact with the material a fatty acid solvent at a temperature to extract the resinous and gummy matter, floating such matter off with the solvent liquid and separating it from the liquid, reheating the liquid and circulating it in contact with the material till sufficiently ungummed, then drawing off the liquid and circulating warm or hot aeriform fluid through the material till dried.

4. The process of preparing and retting fiber material, which consists in extracting tannic acid by circulating in contact with the material warm water, then circulating in contact with the material a solvent liquor containing acetic acid till the gummy and resinous matter is extracted, separating and collecting such matter, reheating and circulating the liquor to complete the ungumming operation, then drawing off the liquor and circulating warm or hot gas in contact with the material till dried.

5. The process of retting and ungumming fiber material, which consists in disposing the material in approximately straight condition in a chamber and subjecting it to the action of hot water and fatty acid solvents circulated in contact therewith, thereby releasing the oily, gummy and resinous matter, floating such matter off with the liquor into an expansion tank and therein causing separation and recovery of such matter, reheating the solvent liquor and repeatedly circulating it through or in contact with the fiber material and causing separation of the oily matter and deposit of the gummy and resinous matter till the material is sufficiently ungummed.

In testimony whereof I affix my signature in presence of two witnesses.

BURDETT LOOMIS.

Witnesses:
T. C. WILLIS,
E. B. CLARK.